United States Patent [19]

Antony

[11] 4,082,616
[45] Apr. 4, 1978

[54] VAPOR COMPRESSION DISTILLER

[75] Inventor: Arthur P. Antony, Shorewood, Wis.

[73] Assignee: Aqua-Chem, Inc., Milwaukee, Wis.

[21] Appl. No.: 598,407

[22] Filed: Jul. 23, 1975

[51] Int. Cl.$^2$ ............................................. B01D 3/42
[52] U.S. Cl. ...................................... 203/3; 202/173;
203/26; 202/181
[58] Field of Search ...................... 203/26, 24, 1, 3, 89;
202/173, 181, 236

[56] References Cited

U.S. PATENT DOCUMENTS

| 3,245,883 | 4/1966 | Loebel | 203/24 |
|---|---|---|---|
| 3,431,179 | 3/1969 | Starmer | 202/181 |
| 3,826,718 | 7/1974 | Takayasu | 202/181 |
| 3,868,308 | 2/1975 | Barak et al. | 202/236 |

*Primary Examiner*—Norman Yudkoff
*Attorney, Agent, or Firm*—Fred Wiviott

[57] ABSTRACT

A vapor compression distiller having a shell for enclosing a generally horizontal heat exchange tube bundle having one end connected to a steam chest and its other end connected to a condensate collecting chamber. A vapor compressor has its inlet connected to the shell and the outlet to the steam chest. The shell includes a pair of spaced apart wells at its lower end which are interconnected by a pipe connected below the expected level of liquid in each well. A half partition extends across the lower end of the vessel and between the wells to divide the lower portion of the vessel into two sections which are in communication across the upper end of the vessel. One well is connected to receive fresh feed liquid and the other includes a density sensor to discharge a portion of the concentrate to therein maintain a desired concentrate level and each well is connected to a spray nozzle manifold disposed in its respective shell section.

15 Claims, 3 Drawing Figures

VAPOR COMPRESSION DISTILLER

BACKGROUND OF THE INVENTION

This invention relates to vapor compression distillers.

One process for concentrating liquids for further use or more convenient disposal involves vapor compression distillers wherein the feed solution is subject to evaporation and the residual liquid becomes more concentrated. Such distillers generally include a heat exchange tube bundle over which liquid is sprayed, and through which compressed vapor is passed. A portion of the feed liquid passing over the external surfaces of the heat exchange tube is vaporized and the remaining more concentrated liquid is collected in a well at the lower end of the device while the vapor passing through the tubes is condensed and withdrawn. The vaporized feed liquid is compressed in a vapor compressor and delivered to the interior surfaces of the heat exchange tubes. When the liquid has been concentrated to the desired degree, it may be withdrawn continuously or periodically from the well and fresh feed liquid is added to replenish that which is withdrawn and the portion that is evaporated.

The efficiency of vapor compression distillers is a function of the difference between the temperature at which the liquid boils and the boiling temperature of water at the same pressure which is called the boiling point elevation (BPE) and the viscosity of the liquid. In the treatment of certain liquids, both the boiling point elevation and viscosity rise in relation to the concentration of the liquid. For example, in waste liquids from soft drink bottling plants which contain a sugar concentration of one to two percent, the boiling point elevation is less than one degree and the viscosity is less than one centipoise. However, when such liquids have been concentrated to a thirty percent sugar solution, the boiling point elevation is about 4° F. and the viscosity is three to four centipoise. The liquid being evaporated in conventional vapor compression distillers has substantially the same concentration as the final concentrate. Accordingly, where there is a substantial boiling point elevation and/or viscosity for the concentrate being evaporated, the efficiency of vapor compression distillers is substantially reduced.

SUMMARY OF THE INVENTION

An object of the present invention is to provide a new and improved vapor compression distiller.

Another object of the present invention is to provide a vapor compression distiller for producing concentrates having substantial boiling point elevation without a substantial adverse effect on efficiency.

These and other objects and advantages of the present invention will become more apparent from the detailed description thereof taken with the accompanying drawings.

DETAILED DESCRIPTION OF THE PREFERRED EMBODIMENT

Figure 1:
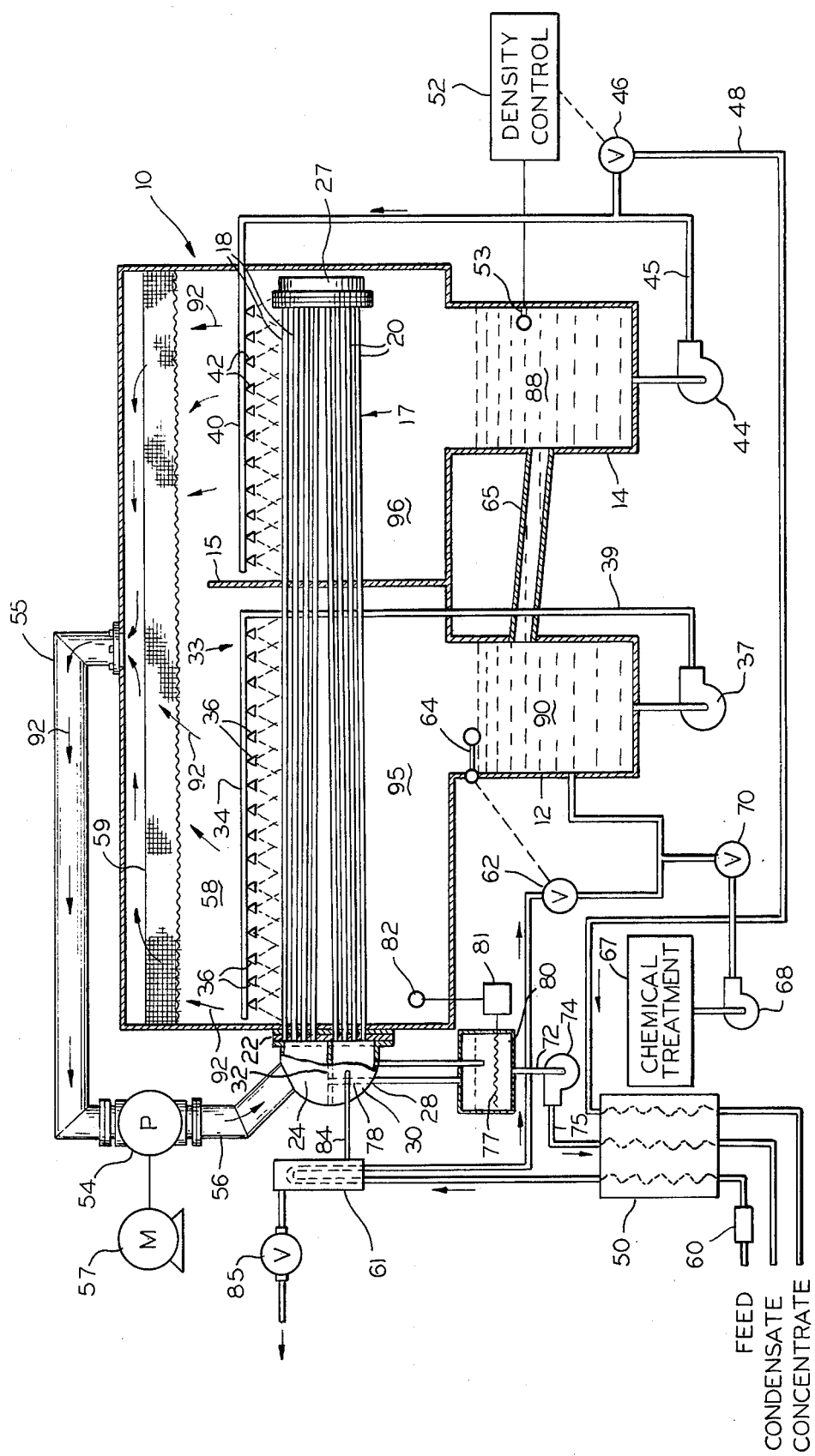
FIG. 1 schematically illustrates a preferred embodiment of the present invention.

FIG. 1 schematically illustrates the apparatus according to the invention to include a hollow metallic shell 10 which may have any convenient configuration which permits the liquid being treated to flow downwardly and collect in a pair of wells 12 and 14 which extend downwardly from the lower end of shell 10 and in spaced apart relation. A vertical partition wall 15 extends upwardly from the lower end of vessel 10 from a point intermediate the wells 12 and 14 and terminates in spaced relation from the upper end of vessel 10. Extending generally horizontally across vessel 10 and through partition 15 is a heat exchanger 17 which may, for example, be of the two pass type, and include a first pair of generally parallel heat exchange tubes 18 and a second pair of heat exchange tubes 20 which are preferably inclined slightly downwardly toward the left as seen in FIG. 1. The left ends of the tubes 18 as viewed in FIG. 1 are received in a suitable tube sheet 22 and open into a steam chest 24 affixed to the end of vessel 10. The opposite ends of the tubes 18 may be coupled to a return manifold 27 which is also connected to the adjacent ends of the tubes 20 while opposite ends of tubes 20 are received in a condensate collecting chamber 28 disposed adjacent the end of vessel 10 and below the steam chest 24. It will be appreciated that instead of employing manifold 27, tubes 18 and 20 may be joined by a U-bend (not shown). The steam chest 24 and condensate collecting chamber 28 may be defined by a single hollow metallic housing 30 affixed to the end of vessel 10 adjacent the tube sheet 22 and divided by a generally horizontally extending partition 32.

A liquid circulation system 33 is provided for distributing the liquid being treated over the heat exchange tubes 18 and 20 and includes spray manifolds 34 and 35. The first manifold 34 extends generally horizontally above the heat exchange tube bundle 17 and on one side of the partition wall 15. Manifold 34 has a plurality of downwardly directed spray nozzles 36 and is connected by a recirculation pump 37 and conduit 39 to the first well 12. Similarly, the second manifold 35 extends horizontally above the heat exchange tube bundle 17 on the opposite side of the partition wall 15 and has a plurality of downwardly directed spray nozzles 42. A second recirculation pump 44 is connected through conduit 45 to manifold 35. In addition, a valve 46 connects conduit 45 to a discharge conduit 48 either directly or through a heat exchanger 50. As will be discussed more fully below, the valve 46 is operatively connected to a density control 52 which is coupled to receive signals from a density sensor 53 disposed within well 14.

A vapor compressor 54 is provided for compressing vapors generated in vessel 10 and for delivering the same to the steam chest 24. Toward this end, a relatively large vapor conduit 55 is connected at one end to the upper end of vessel 10 while its other end is connected to the inlet of vapor compressor 54. A second vapor conduit 56 connects the outlet of vapor compressor 54 to the steam chest 24. Any conventional compressor 54 may be employed such as a centrifugal compressor which is driven by any suitable engine or motor 57.

It will be appreciated that the vessel 10 defines a vapor generating space 58 which is connected by a conduit 55 and compressor 54 to the inlet ends of the first group of heat exchange tubes 18. A vapor entrainment separating device 59 extends across the upper end of vessel 10 and between the vapor generating space 58 and the inlet of conduit 55.

Fresh feed liquid is provided to well 12 by conduit 60 which is connected at its remote end to a source of such liquid through the heat exchanger 50, a vent condenser 61, and a control valve 62. A float controller 64 is disposed in well 12 and is coupled to valve 62 for regulating the delivery of feed liquid to well 12 in accordance with the level of liquid therein. In addition, a coupling pipe 65 is connected to well 12 adjacent its upper end and slopes downwardly where its other end is coupled to well 14. Accordingly, the level of liquid in the wells 12 and 14 will remain substantialy equal to each other and substantially at the same level.

If the feed liquid contains dissolved substances which would tend to form a scale on the heat exchange tube surfaces, a chemical treatment source 67, containing acid, polyphosphate or other suitable chemical, depending on the system temperature and nature of the liquid, may be connected to conduit 60 through a feed pump 68 and a valve 70. The lower end of the condensate collecting chamber 30 is connected by conduit 72 to the inlet of a condensate pump 74, the outlet of which is connected throgh conduit 75 and heat exchanger 50 to storage or use. A condensate boiler 77 may be connected into conduit 72 for generating small quantities of additional vapor which are delivered by conduit 78 to the steam chest 24. The boiler 77 includes a heater 80 connected to a control 81 which in turn receives signals representative of pressure in vessel 10 from a pressure sensor 82. In this manner, additional heat may be added to the system in the event that pressure within vessel 10 falls below desired limits. A further conduit 84 connects the condensate collecting chamber 28 to a valve 85 through vent condenser 61. Valve 85 may be selectively operable to couple the vent condenser to a vacuum source (not shown) whereby any uncondensed vapors exiting the heat exchange tubes 17 may be condensed in vent condenser 61 and noncondensible gases withdrawn.

In operation of the system illustrated in FIG. 1, let us assume by way of example that the liquid to be concentrated consists of waste from a food processing or soft drink bottler and comprises a water-sugar solution having a sugar concentration of 1–2%. This solution may, for example, have a temperature of about 70° F. at the inlet of heat exchanger 50 and will undergo a temperature rise in the latter heat exchanger and the vent condenser 61 to provide a temperature of about 210° F. at the inlet of well 12. In the hypothetical example, the density control 52 is set so that concentrate will be withdrawn from well 14 when the concentration of sugar in solution 88 therein is approximately 30%. Under these conditions, the liquid 90 in well 12 will be at an intermediate concentration between that of the feed liquid and that in well 14, or approximately 6%.

The recirculation pumps 37 and 44 are operated to draw feed liquid from the wells 12 and 14 and deliver the same to the manifold pipes 34 and 35, respectively. The feed liquid is then sprayed onto the outer surfaces of the heat exchange tubes 18 and 20 through which heated vapor from compressor 54 is passing. As a result of the temperature and pressure within the vessel 10 and of the liquids 88 and 90, a portion of said liquid being sprayed on tubes 18 and 20 vaporizes and collects in the vapor space 58 while the unevaporated portion of the liquid returns to its respective brine wells 12 and 14.

The partition 15 prevents any of the unevaporated liquid from the spray nozzles 36 or 42 from flowing into the other well 12 or 14.

The vaporized feed liquid symbolized by the arrows 92 passes upwardly through the vapor separator where entrained droplets are removed and then passes to the inlet of the compressor 54. In the hypothetical example, the compressor 54 raises the temperature of the vapor from the boiling temperature of the liquid being treated, which is approximately 213°–216° F. to a saturation temperature of approximately 226° F. The vapor then passes serially through the heat exchange tubes 18 and 20 where substantially all of the vapor is condensed as it gives up its heat of vaporization for evaporating the liquid flowing as a thin film over the outer surfaces of the tubes. The condensed vapor in tubes 18 and 20 is collected in chamber 30 and withdrawn by pump 74 for passage through the heat exchanger 50.

As indicated previously, concentrated liquid 88 from sump 14 is periodically removed through pipe 48 when density sensor 53 indicates that concentration thereof is about 30%. A portion of the liquid from the wells 12 and 14 is also evaporated as indicated previously. The float control 64 maintains the level of liquid in wells 12 and 14 so as to compensate for the concentrate discharged and the liquid evaporated by periodicaly opening valve 62 to admit more feed liquid to well 12. The dilute liquid 90 in well 12 is a mixture of the fresh feed liquid delivered from pipe 60 and the unevaporated feed liquid which falls to the lower end of vessel 10 and on one side of the partition 15. The concentrate liquid 88 in well 14 is a mixture of the liquid 88 which flows to well 14 through pipe 65 and the unevaporated liquid in tank 10 which falls to the other side of partition 15.

Figure 2:
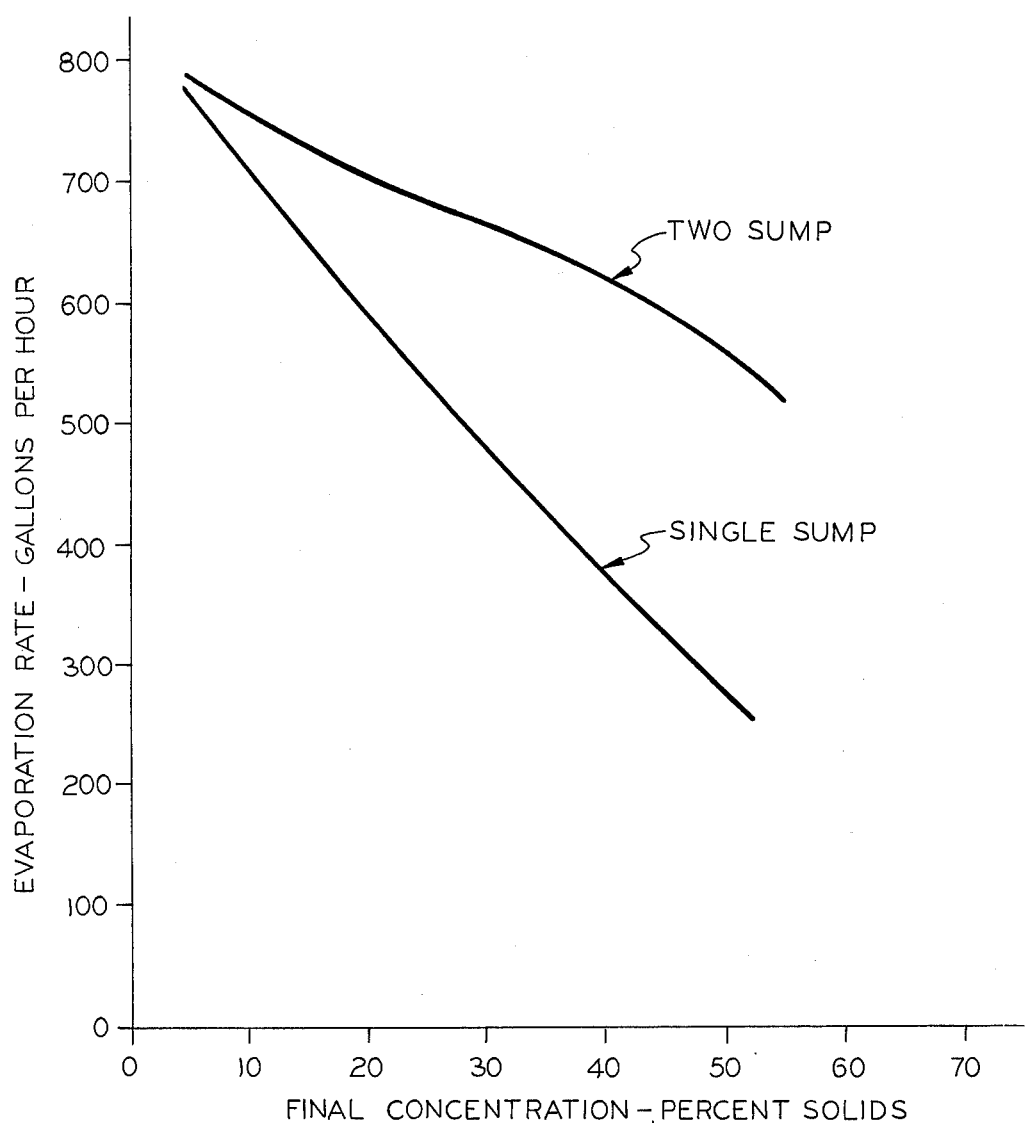
FIG. 2 illustrates the relative efficiency of the apparatus shown in FIG. 1 to conventional devices.

It is well known that the distillate output of a vapor compression distiller, such as that illustrated in FIG. 1, is a function of the boiling point elevation of the liquid that is, the difference between the boiling temperature of the particular liquid and that of water at the same pressure and the viscosity of the liquid. Additional factors which effect evaporation such as the surface area of the heat exchange tubes 18 and 20, the heat input to the system and the temperature within the chamber 10 are determined by the parameters of the system. For any given solution and other system parameters, the distillate output of this system and other system parameters, the distillate output of this system does not change linearly but falls off exponentially as the boiling point elevation and viscosity increase. This can be illustrated with reference to the hypothetical example wherein the feed liquid being treated is waste from a soft drink bottling plant comprising an aqueous solution containing one–two percent sugar. Assume that the input of the vapor compressor is about 60 hp. and that the area of the heat exchange tubes 18 and 20 is 1,420 sq. ft. With such a system employing a single sump wherein the concentrate would have 30% dissolved solids and a viscosity of 3.5–4 centipoise and a BPE of 4° F. the output of distillate would be approximately 480 gal/hr. With the second well 12 and the partition 15 located to provide a tube surface of 555 ft.$^2$ in the area to the right of the partition and 865 ft.$^2$ to the left, a 6% concentration and a viscosity of 0.7 centipoise and a BPE of 0.6° F. in well 12, the distillate production with respect to the vessel portion 95 is 535 gal/hr. and the vessel portion 96 is 150 gal/hr. for a total output of about 685 gal/hr. This substantially greater output from a system having substantially the same input as a single well unit results from the fact that the evaporating efficiency in the chamber portion 95 is substantially greater as a result of the lower boiling point elevation and viscosity of the liquid in well 12. This effect is enhanced by positioning the partition 15 such that the length of the tubes and chamber portion 95 is greater than that in chamber portion 96. FIG. 2 is a projected curve which illustrates a comparison of the output of the angle sump vapor compressor and the two sump apparatus discussed in the hypothetical example.

Figure 3:
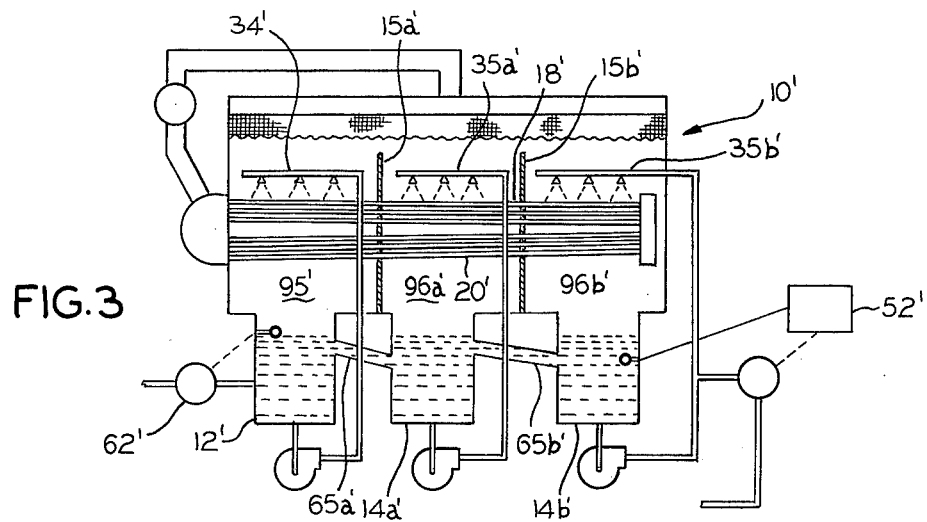
FIG. 3 shows a modified form of the preferred embodiment of the invention.

It will be appreciated that the invention is not limited to the use of two sumps and spray manifolds but that greater members may be employed depending upon the liquid being evaporated and the desired final concentration. For example, FIG. 3 illustrates an evaporator 10' having sumps 12', 14a' and 14b'. Sump 12' is coupled to receive feed liquid under the control of a float operated valve 62' in the manner discussed with respect to sump 12 of FIG. 1. A first conduit 65a' connects sumps 12' and 14a' beneath ttheir liquid levels and pipe 65b' similarly connects sumps 14a' and 14b' while density control 52' effects the discharge of liquid from the last sump 14b' when the desired density level is reached. A pair of partitions 15a' and 15b' divided evaporator 10' into compartments 95', 96a' and 96b'. The sumps 12', 14a' and 14b' are respectively connected to spray manifolds 34', 35a' and 35b' disposed in compartments 95', 96a' and 96b' and above tube bundles 18' and 20'. The apparatus illustrated in FIG. 3 operates in the same manner as that discussed with respect to FIG. 1 except that the concentration of the liquid in sump 14a will be intermediate that of the initial sump 12' and the final sump 14b. Thus, the boiling point elevation and/or viscosity of the liquid in sump 14a' will also be less than that of the liquid in sump 14b and accordingly, higher evaporation rates are possible.

While only a few embodiments of the present invention are illustrated and described, it is not intended to be limited thereby but only by the scope of the present invention.

I claim:

1. A method of concentrating liquids comprising the steps of delivering a liquid to be concentrated to a first liquid circulating system and mixing the same with a partially concentrated liquid therein for providing a first liquid mixture, contacting a first outer surface area of a plurality of a heat exchange tubes with said first liquid mixture, delivering a portion of said first liquid mixture to a second liquid circulating system containing a second mixture of said liquid which is more heavily concentrated than the first liquid mixture, delivering said second liquid mixture to a different surface area of said heat exchange tubes, passing compressed vapor uninterruptedly through the interior of said heat exchange tubes and in heat exchange relation with interior surfaces of said tubes corresponding to the first and different surface areas thereof for condensing said vapor and for simulaneously evaporating at least a portion of said first and second liquid mixtures as the same contacts said first and different surface areas of said heat exchange tubes, separately collecting the unevaporated portions of said first liquid mixture in a first container of said first liquid circulating system and said second liquid mixture in a second liquid container of said second liquid circulating system, collecting the evaporated portions of said first and second liquid mixtures and compressing the same for delivery to the interiors of said heat exchange tubes.

2. The method set forth in claim 1 and including measuring the density of liquid in said second liquid container and discharging a portion of said second liquid mixture when the same reaches a predetermined concentration.

3. The invention set forth in claim 2 and including the step of determining the level of liquid in said first container and delivering liquid to be concentrated thereto when the liquid level therein falls below a predetermined value.

4. The invention set forth in claim 1 and including the step of determining the level of liquid in said first container and delivering liquid to be concentrated thereto when the liquid level therein falls below a predetermined value.

5. A vapor compression distiller including a vessel,
partition means disposed in said vessel for dividing the lower portion thereof into a plurality of compartments, said compartments being in communication at the upper end of said partition,
a plurality of heat exchange tubes disposed within said vessel and extending uninterruptedly through said partition means, a portion of the evaporative surface of each of said tubes being disposed in each of said compartments,
a plurality of liquid wells, each of said wells being connected to and in fluid communication with a different one of said compartments,
means for serially interconnecting said wells,
a plurality of liquid distributing means, one of said distributing means being disposed in each compartment, respectively,
a plurality of liquid circulating means, each of said circulating means being connected for distributing liquid from a different one of said wells to the liquid distributing means in its associated compartment, each of said liquid distributing means being operative to distribute liquid over that portion of the evaporative surface of said heat exchange tubes in its associated compartment, said wells being disposed for receiving the respective unevaporated liquid from its associated liquid distributing means,
feed liquid delivery means for delivering feed liquid to the initial one of said serially connected wells and discharge means for discharging concentrate from the last of said serially connected wells,
vapor compression means connected to the upper portion of said vessel for receiving vapor from said compartments and for compressing the same, said vapor compression means also being connected to one end of said heat exchange tubes for delivering compressed vapor thereto, and
means for collecting condensate from the other end of said heat exchange tubes.

6. A vapor compression distiller including a vessel, partition means disposed in said vessel for dividing the lower portion thereof into first and second compartments, said compartments being in communication at the upper end of said partition means,
a plurality of heat exchange tubes disposed within said vessel and extending uninterruptedly through said partition means so that a substantial portion of the surface area of each tube is disposed in each compartment, first and second feed liquid circulating means, said first feed liquid circulating means incuding a first well connected to said vessel and communicating with said first compartment, first liquid distributing means disposed in the first compartment adjacent that portion of the tubes located in said compartment and first means for withdrawing liquid from said first well and delivering the same to said first liquid distributing means, whereby said liquid is distributed over that portion of the heat exchange tubes in said first compartment so that a portion of said liquid evaporates, said second liquid circulating means includes a second well connected to said vessel and communicating with said second compartment, second liquid distributing means disposed in said second compartment and disposed adjacent that portion of the tubes located within said second compartment and second means for withdrawing liquid from the second well and delivering the same to said second liquid distributing means whereby said liquid is distributed over that portion of the heat exchange tubes in said second compartment so that a portion of said liquid evaporates, said first and second wells being disposed for receiving the respective unevaporated liquid from said first and second liquid distributing means, means for interconnecting said wells to permit the flow of liquid from said first well to said second well, feed liquid delivery means for delivering feed liquid to the first liquid circulating means and discharge means for discharging concentrate from said second liquid circulating means, vapor collecting means communicating with each of said compartments for simultaneously collecting evaporated liquid therefrom, vapor compression means connected to said vapor collecting means for receiving said collected vapor and for compressing and delivering the same to said heat exchange tubes, and means for collecting condensate from said heat exchange tubes.

7. The vapor compression distiller set forth in claim 6 wherein said heat exchange tubes extends generally horizontally, said first and second wells are connected to the lower portion of said vessel.

8. The vapor compression distiller set forth in claim 7 wherein said well interconnecting means includes pipe means extending between each of said wells and below the expected level of liquid in each.

9. The vapor compression distiller set forth in claim 8 wherein said feed liquid delivery means includes liquid level control means coupled to said first well for delivering feed liquid thereto when the liquid level therein falls below a predetermined level.

10. The vapor compression distiller set forth in claim 9 wherein said partition means divides the surface areas of said head exchange tubes in first and second areas disposed respectively in said first and second compartments, said first surface area being substantially larger than the second.

11. The vapor compression distiller set forth in claim 10 wherein said discharge means includes density measuring means coupled to said second well and operative for discharging liquid therefrom when the liquid therein reaches a predetermined concentration.

12. The vapor compression distiller set forth in claim 6 wherein said partition means divides the surface areas of said heat exchange tubes into first and second areas disposed respectively in said first and second compartments, said first surface area being substantially larger than the second.

13. The vapor compression distiller set forth in claim 6 wherein said well interconnecting means includes pipe means extending between each of said wells and below the expected level of liquid in each.

14. The vapor compression distiller set forth in claim 6 wherein said feed liquid delivery means includes liquid level control means coupled to said first well for delivering feed liquid thereto when the liquid level therein falls below a predetermined level.

15. The vapor compression distiller set forth in claim 6 wherein said discharge means includes density measuring means coupled to said second well and operative for discharging liquid therefrom when the liquid therein reaches a predetermined concentration.

* * * * *

UNITED STATES PATENT OFFICE
CERTIFICATE OF CORRECTION

Patent No. 4,082,616      Dated April 4, 1978

Inventor(s) Arthur P. Antony

It is certified that error appears in the above-identified patent and that said Letters Patent are hereby corrected as shown below:

Claim 10, Column 8, line 16, cancel "head" and substitute --heat--;

same line, cancel "in" and substitute --into--

Signed and Sealed this

Twenty-sixth Day of December 1978

[SEAL]

Attest:

RUTH C. MASON
*Attesting Officer*

DONALD W. BANNER
*Commissioner of Patents and Trademarks*